Feb. 1, 1944.   J. B. RIDDLE   2,340,563
GRAIN HEADING MACHINE
Filed June 29, 1942   3 Sheets-Sheet 1
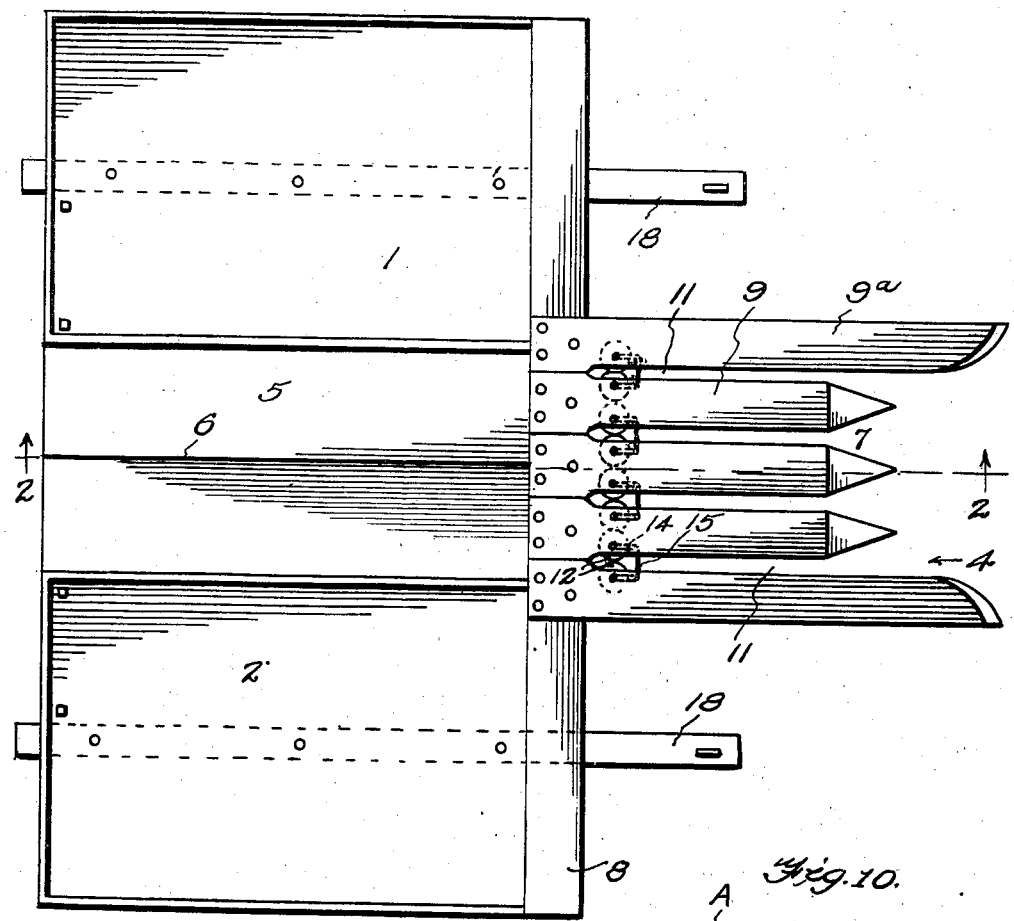
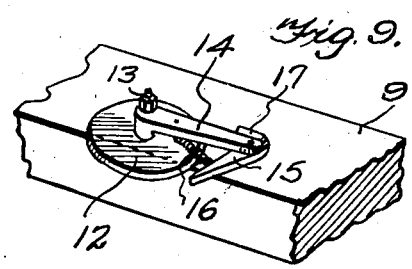
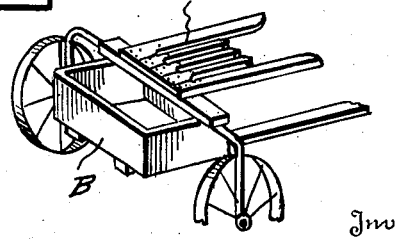
Inventor
JIMMIE B. RIDDLE
By
Attorney

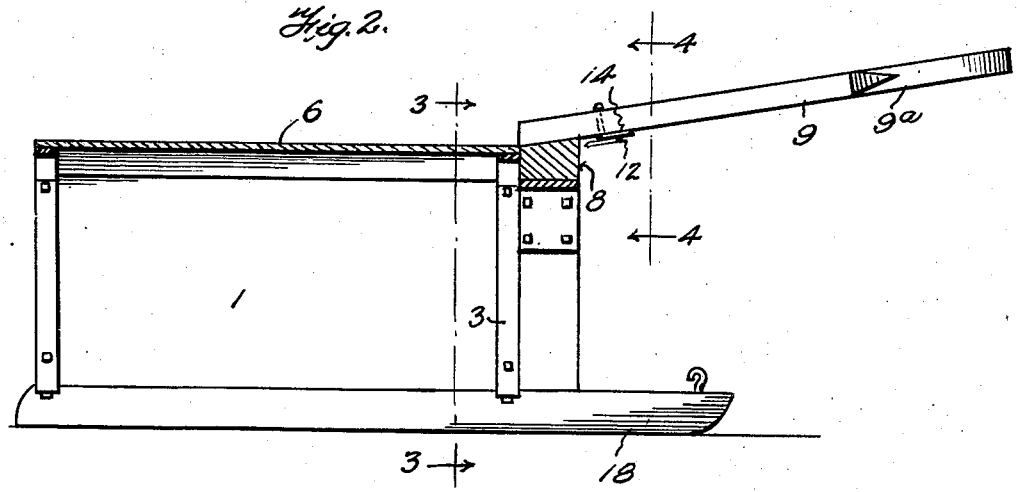
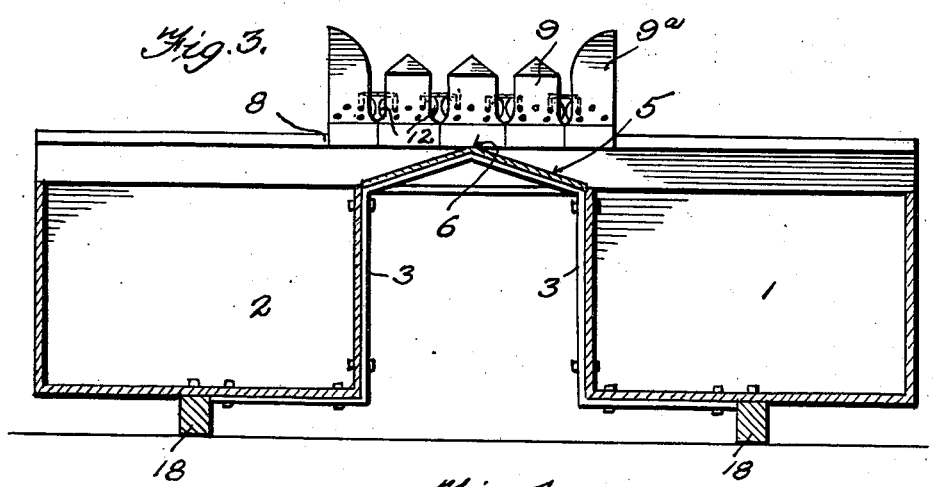
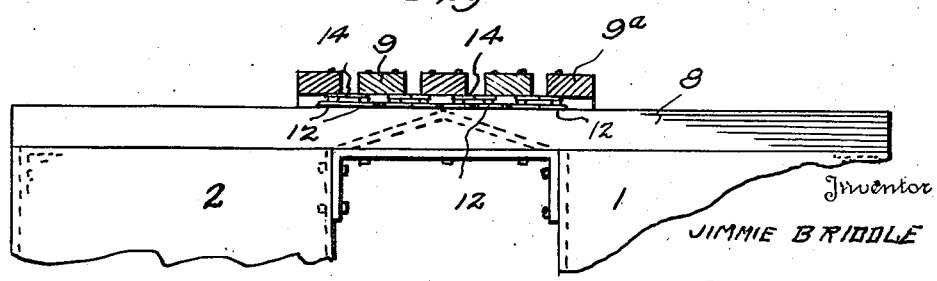

Feb. 1, 1944.  J. B. RIDDLE  2,340,563
GRAIN HEADING MACHINE
Filed June 29, 1942  3 Sheets-Sheet 3
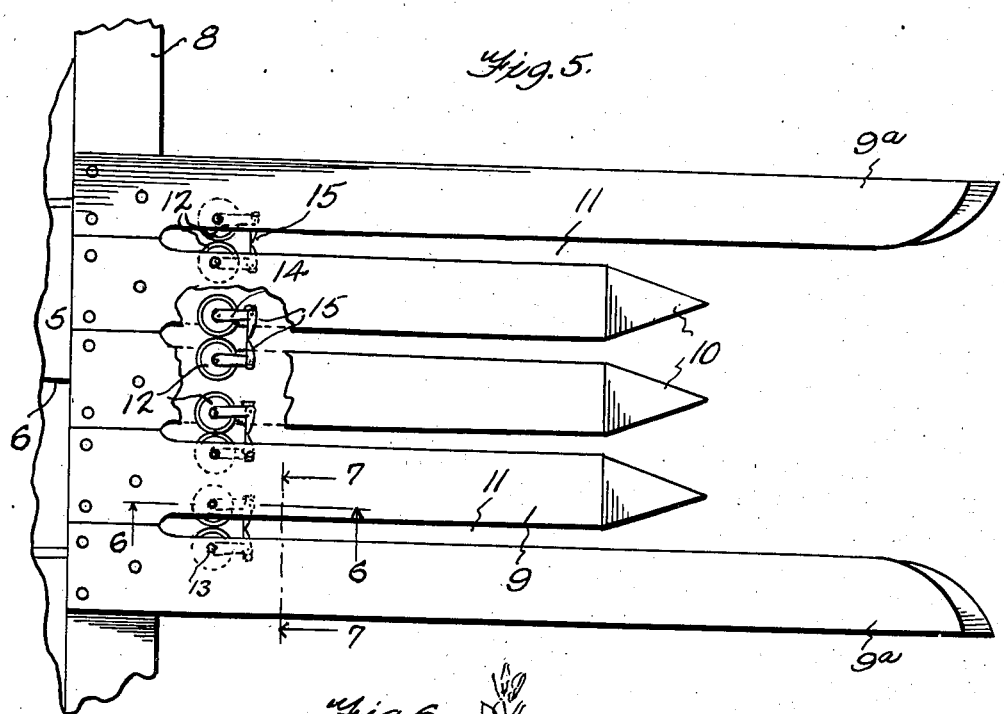
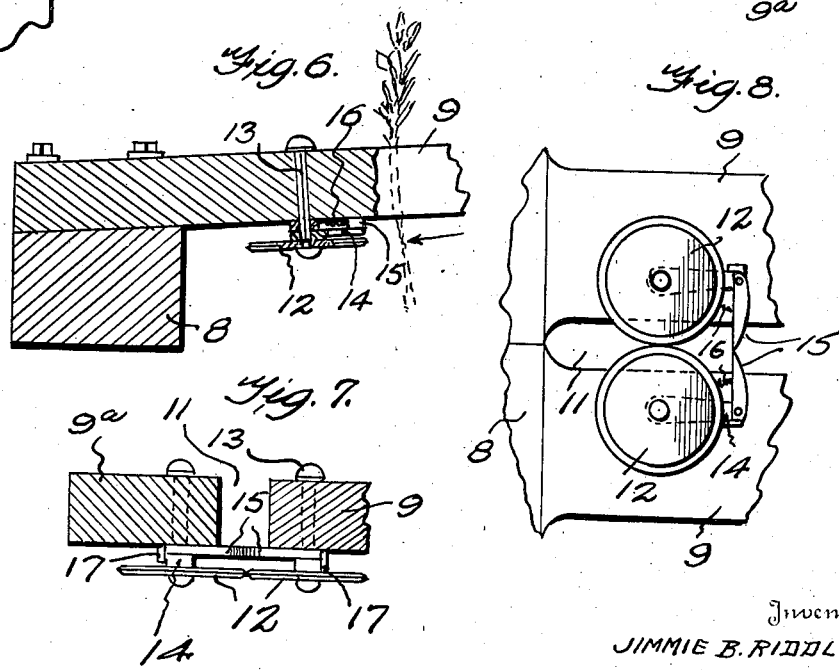
Inventor
JIMMIE B. RIDDLE
By Irving L. McCathran
Attorney Patented Feb. 1, 1944

2,340,563

UNITED STATES PATENT OFFICE 2,340,563

GRAIN HEADING MACHINE

Jimmie B. Riddle, Polar, Tex.

Application June 29, 1942, Serial No. 448,954

4 Claims. (Cl. 56—194)

This invention relates to a grain heading machine, and has for its primary object the production of a machine which will efficiently head grain irrespective of the height of growth thereof.

Another object of the invention is the construction of a machine which will not only efficiently head the grain, but will convey the same from the cutting mechanism into suitably placed boxes, thereby enabling the machine to have a continuous travel over the ground while continuously cutting the grain, thereby materially reducing the time of such operation and the amount of labor connected therewith.

A further object of this invention is the novel construction of cutting mechanism arranged at an incline so that the cutters carried thereby can effectively engage the head portions of grain, the height of growth of which varies over the land being harvested.

One important feature of the invention is the simplicity of the construction and novel formation and arrangement of the conveying plate with relation to the special cutter structure so that as the grain is cut, the cut material will be immediately deposited onto the conveyor plate for conveyance into suitably placed boxes, the standing stalks of grain passing between the boxes due to the provision of a passage between the boxes.

With these and other objects in view, my invention will be better understood from a description of the same when taken in connection with the accompanying drawings, wherein:

Figure 1 is a top plan view of the machine;

Figure 2 is a longitudinal sectional view taken on line 2—2 of Figure 1;

Figure 3 is a transverse sectional view taken on line 3—3 of Figure 2;

Figure 4 is a transverse sectional view of a portion of the cutting mechanism taken on line 4—4 of Figure 2;

Figure 5 is an enlarged top plan view of the cutting fingers, certain parts being broken away;

Figure 6 is an enlarged longitudinal sectional view taken on line 6—6 of Figure 5;

Figure 7 is a transverse sectional view taken on line 7—7 of Figure 5;

Figure 8 is a bottom plan view showing the inner end of a pair of fingers and the cutting discs carried thereby;

Figure 9 is an inverted perspective view of one of the fingers and cutting disc carried thereby; and Figure 10 is a perspective view of a modified type of grain heading machine.

By referring to the drawings illustrating my invention, the numerals 1 and 2 designate a pair of boxes arranged in spaced relation by the braces 3, so as to provide a passage 4. Arched over this passage is a conveyor plate 5 inclining in opposite directions, from a central point 6, so that the grain or other material deposited therein will automatically gravitate toward the boxes 1 and 2 which may accumulate thereon. This plate for this purpose is arranged directly behind my novel cutting structure 7 now to be described.

This cutting mechanism or structure comprises a head 8 from which projects at an upwardly and forwardly inclined angle to the horizontal, a plurality of aligning inner fingers 9 and outer guide fingers 9ª of greater length than the fingers 9. The inner fingers 9 are provided with pointed extremities 10 so as to facilitate the passage of the fingers between the grain and the conveyance of the heads of grain into the slots 11 provided between the fingers so that the head portion will be effectively directed by the guards into engagement with the cutting dics 12. As shown in the drawings, the discs 12 are carried by the adjoining fingers 9 and 9ª (see the enlarged views Figure 5 and Figure 8). The discs 12 carried by these respective fingers extend into one-half the width of the slots 11 so that the cutting edges of the adjacent discs carried by the adjacent fingers are arranged in close relation to facilitate cutting of the grain as the grain passes longitudinally of the slots 11 and into contact with the cutting discs 12.

Each disc 12 is rotatably mounted upon the lower end of a supporting bolt 13, and the bolt 13 is preferably square in cross section, as shown in Figure 5. The discs 12 are preferably supported below the bottom faces of the fingers 9 and 9ª. An arm 14 is secured to the squared portion of each bolt 13 below the fingers 9 and 9ª, and the adjoining pairs of arms 14 carry pivoted inwardly projecting guard latches 15 which span the slots 11 in advance of the discs 12, as shown. These latches 15 are adapted to swing inwardly toward the discs 12 against the compression springs 16 which normally hold the latches 15 at right angles to the arms 14. Suitable means, such as stops 17, may be provided to limit the swing of the latches in the opposite direction. As the latches 15 swing inwardly, the grain will contact the discs 12 and be cut by the discs 12.

The machine may be supported on runners 18, as shown in Figures 1, 2 and 3, and the runner 18 for each box 1 and 2 is positioned to travel in the runway between the rows of grain. If desired, the cutting mechanism A shown in Figure 10, similar in detail to that previously described, may be mounted upon a truck B supported by wheels.

It should be understood that certain detail changes may be employed without departing from the spirit of the invention, so long as these changes fall within the scope of the appended claims, and that the machine may be used as a multi-row header propelled under tractor power, and may be designed for any number of rows.

Having described the invention, what is claimed is:

1. A grain heading machine comprising a pair of boxes supported for travel, heading means positioned between and in advance of said boxes at an incline to the horizontal, and an arched conveyor plate arranged behind said boxes for conveying material from said means to said boxes, said conveyor plate being inclined downwardly from its center toward said boxes, and said heading means including movably mounted knives located for engagement with the grain.

2. A grain heading machine of the class described comprising a plurality of forwardly extending grain gathering fingers arranged in spaced relation, cutting knives carried near the inner ends of the fingers and protruding into the spaces between the fingers, and guard latches carried by the adjacent fingers and overlying the spaces between the fingers and arranged in advance of the cutting knives, said latches being capable of swinging inwardly toward said knives to permit grain to pass by the fingers and into contact with the knives, and the latches normally closing the spaces between the fingers in advance of the cutting knives to provide a grain holding pocket adjacent the cutting knives and to prevent grain from being pushed forwardly and out of contact with the knives.

3. A grain heading machine of the class described comprising a support, a plurality of protruding fingers having spaces formed therebetween, the spaces between the fingers having closed inner ends, cutting knives carried by the fingers and protruding into the spaces between the fingers for shearing grain as the grain passes longitudinally of the spaces between the fingers and to contact with the knives, pivoted guard latches carried by the fingers and projecting into the spaces between the fingers to normally close off a portion of the space between the fingers, the guard latches being spaced in advance of the cutting knives, and the fingers being movable inwardly to permit the entrance of grain to a point of contact with the knives, and means for limiting the swing of the fingers to an inward swinging motion in a manner whereby grain may be held in back of the fingers and in contact with the knives.

4. A grain heading machine of the class described comprising a support, a plurality of protruding fingers having spaces formed therebetween, the spaces between the fingers having closed inner ends, cutting knives carried by the fingers and protruding into the spaces between the fingers for shearing grain as the grain passes longitudinally of the spaces between the fingers and to contact with the knives, pivoted guard latches carried by the fingers and projecting into the spaces between the fingers to normally close off a portion of the spaces between the fingers, the guard latches being spaced in advance of the cutting knives, the fingers being movable inwardly to permit the entrance of grain to a point of contact with the knives, means for limiting the swing of the fingers to an inward swinging motion in a manner whereby grain may be held in back of the fingers and in contact with the knives, and spring means for normally holding the latches in a position to span the spaces between the fingers.

JIMMIE B. RIDDLE.